United States Patent Office 3,313,836
Patented Apr. 11, 1967

3,313,836
PREPARATION OF DIALKYLALUMINUM ARALKOXIDE BY DECOMPOSITION OF ETHERATES
Wolf R. Kroll, Linden, N.J., assignor to Continental Oil Company, Ponca City, Okla., a corporation of Delaware
No Drawing. Filed Nov. 13, 1961, Ser. No. 152,023
4 Claims. (Cl. 260—448)

This invention relates to a process for preparing aliphatic monohydric alcohols or alcoholate percursors thereof. More particularly, the process of this invention concerns the pyrolysis or heat-induced cleavage of certain etherates to yield stable decomposition products capable of being converted to an aliphatic mono alcohol or alcohols. Still more specifically, the present invention relates to a process for preparing aliphatic mono alcohols which comprises reacting an aluminum trialkyl with an ether containing at least one aryl substituted carbon vicinal to an ether oxygen to form an etherate, decomposing said etherate with application of heat to yield a dialkyl alkoxide followed by hydrolysis of said alkoxide or oxidation of the dialkyl alkoxide with subsequent hydrolysis of the oxidation product. In narrower aspects, the invention further relates to continuous methods for effecting the formation of dialkyl alkoxides in accordance with the foregoing and additionally, appertains to a process for the preparation of monohydric alcohols wherein said dialkyl alkoxides are utilized as intermediates.

The general reaction scheme underlying the process of this invention has been known for many years. The basic reaction involved is usually referred to as the Schorigin reaction, being so named after its discoverer who originally reported that ethyl sodium in absolute ether gave rise to a voluminous grey-white precipitate which disappeared upon addition of water resulting in the formation of ethanol as the main product of the reaction. In the past it had been considered imperative that an alkali metal alkyl be used in order to prepare the necessary type of etherate which upon cleavage or pyrolysis resulted in the desired alcoholate. To the best of my knowledge there has been no case recorded in the literature where other than alkali metal alkyl is reported as capable of decomposing an ether under moderate conditions.

In using alkali alkyls in the classical Schorigin reaction, several practical difficulties are normally experienced. Generally, the more effective alkali metal compounds, such as for example, the potassium alkyls, are extremely reactive and consequently it is rather difficult to control the reaction so as to minimize undesirable side reactions. In view of this prior art wherein alkali metal alkyls were exclusively employed in the manner indicated, it was most surprising to find that under certain circumstances organo aluminum compounds will react with ethers to yield etherates which can be ultimately decomposed to give products containing a high percentage yield of the desirable component, i.e., an alcoholate capable of being converted to the corresponding alcohol. Another surprising attribute of my discovery resides in the fact that the use of the organo aluminum compound in accordance therewith permits the use of moderate conditions throughout the entire process, thereby affording an optimum environment for the reactions involved. There is, however, one significant different between the use of organo aluminum compounds in accordance with this invention as compared to the prior art use of alkali metal alkyls, and that is, only a particular class or type of ethers is applicable. Details with respect to the type of ether that is required in my process will be presented hereinbelow.

The products, and more specifically, the monohydric alcohols, obtained in the practice of this invention represent valuable and useful chemical substances. Thus, alcohols useful directly as such or as intermediates in the pharmaceutical and perfume industries can be readily prepared in accordance with the instant invention. Additionally, such alcohols or derivatives thereof find usefulness as petrochemical intermediates. While the aforesaid production of alcohols represents the principal objective of this invention, other objects thereof consist of providing methods for the preparation of hydrocarbons. These and still other ancillary features will be more readily understood by those skilled in the art upon consideration of the detailed discussion presented herein.

Before proceeding with the detailed description of this invention, the underlying reactions involved will be enumerated directly hereinbelow. In so doing, an illustrative scheme of each reaction will be depicted. It is, of course, to be understood that the invention is not limited to use of the reactants shown nor dependent upon the precise mechanism indicated in these particular exemplifications.

(1) Formation of an etherate:

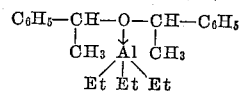

(2) Cleavage of the etherate with formation of paired products:

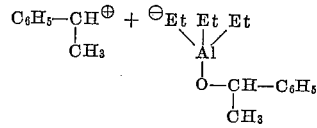

(3) Stabilization of cleavage products:

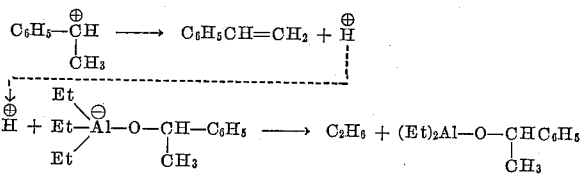

Each of the above reactions will now be considered in detail.

As alluded to in the summary hereinabove, the etherates suitable in the practice of this invention are derived from a particular type of ether. Firstly, the ether should most desirably be a simple ether. Sometimes the designation "simple ether" merely implies a symmetric compound. However, a simple ether in terms of this invention includes both symmetric and asymmetric ethers but singularly implies that only hydrocarbon radicals containing no nonbenzenoid unsaturation are attached to the ether oxygen atom. In some instances it is possible to use an ether containing substituents which are not strictly hydrocarbons such as aralkyl radicals having halo substituents and the like in the aryl nucleus, but such ethers are preferably to be avoided. Suitable simple ethers for the purposes herein are those containing at least one aryl substituent on the carbon atom in the alpha position with respect to the ether oxygen. Again it is mentioned that any simple ether whether a mono symmetric or asymmetric ether or an ether containing a plurality of ether linkages are applicable, so long as the ether contains the aryl substituents as indicated. Of course, in the case of symmetric mono ethers, such ethers can be substituted in each alpha carbon position with an aryl substituent. Besides containing the aryl substituent as mentioned, the alpha carbon atom so substituted should preferably contain at least one other hydrocarbon substituent which can be either alkyl, aryl or aralkyl. Additionally, thioethers otherwise corresponding to the foregoing can be used in the practice of my invention.

As representative specific examples of ethers useful herein there are the following:

α-Methylbenzyl-butyl-ether, benzhydryl-decyl-ether, α-octylbenzyl-octyl-ether, α-dodecylbenzyl-phenyl-ether, α-cyclohexyl-benzyl-naphthyl-ether, benzhydryl-cyclohexyl-ether, α-benzyl benzyl-hexyl-ether, bis-(α-methylbenzyl)ether, bis-(α-butyl-benzyl)-ether, (α-methyl-benzyl)-(α-butyl-benzyl)-ether, and the like.

The aluminum trialkyls suitable for forming the etherate can be any such organo-metallic compounds having alkyl radicals ranging from 1 to about 50 carbon atoms. Preferably, however, the alkyl substituent contains from 1 to about 6 carbon atoms. Aluminum trialkyls where the alkyl substituents are different or even mixtures of various aluminum trialkyls are applicable.

The aluminum alkyls having lower alkyl substituents can be obtained easily by various known processes. The higher alkyl aluminum compounds on the other hand, can be readily obtained by reacting a low molecular weight olefin such as ethylene or propylene with either triethylaluminum or tripropylaluminum but more preferably the former. The mechanism involved in preparing higher alkylaluminum compounds by this procedure is usually referred to as a growth reaction. A wide variety of reaction conditions can be utilized to accomplish such growth. For example, a temperature within the range of from about 65 to 150° C. and a pressure of from about 200 to 500 p.s.i. can be used. Further details regarding the growth reaction can be found in British Patent Nos. 763,824 and 713,081, among others.

In forming the etherate, stoichiometric amounts of the reactants can be employed. However, reaction mixtures composed of either a substantial deficiency of the ether or of the aluminum hydrocarbon can also be used. It is preferred to use atmospheric pressures, but super-atmospheric pressures are likewise applicable. Temperatures suitable for forming the etherate are not critical. Preferably, the temperature is less than about 50° C. Oftentimes, however, the use of temperatures in excess of about 50° C. facilitates formation of the etherate with attendant cleavage thereof.

The cleaving of the etherate is accomplished primarily by heating the etherate to an elevated temperature. For optimum results it is preferred to use a temperature between about 100 and 150° C. or even somewhat higher. The cleavage reaction is a transitory one, resulting immediately in the stabilization phase identified above as reaction (3). The products of the cleavage reaction are fundamentally unstable paired ionic products although as indicated the rearrangement of these paired products which occurs immediately upon the formation thereof might practically be viewed as the products of the cleavage reaction.

As pointed out above, the stabilization of the paired products obtained upon cleaving the etherate occurs immediately after their formation. Obviously then, the stabilization phase as contemplated herein occurs in the same temperature range and for all practical purposes, at the identical temperature used to effect cleavage.

In regard to the reaction scheme given above illustrating the mechanism whereby stabilization occurs, it is to be mentioned that this mode is one of the three readily perceived ways in which stabilization of the paired products can follow. In another mode, there is no alkane or alkene generated, e.g., only sec. butylbenzene is produced. In a third possible type of stabilization, an alkene, i.e., ethylene, in addition to ethylbenzene is produced. The particular mode by which the stabilization occurs is primarily dependent upon the nature of the reactants and possibly to some extent upon the temperature conditions used to effect cleavage. However, irrespective of which particular mechanism is involved in the stabilization reaction the molar ratio of the desired dialkyl alkoxide product to the etherate starting material is identical.

It is preferred to carry out the composite cleavage and stabilization steps under subatmospheric conditions. In this manner the hydrocarbons formed in the course of the reaction can be readily distilled out of the reaction mixture leaving the aluminum organic component essentially recoverable as such.

Cleavage and stabilization can be carried out in a continuous manner and as a matter of fact, this represents the preferred procedure. A continuous operation can be effected conveniently by spraying the etherate into a reaction vessel, maintaining the necessary temperature conditions in the reactor, and thus, recovering the hydrocarbons formed from the top of the reactor while at the same time withdrawing the desired aluminum alkoxide at the bottom of the vessel. Another version of the continuous process consists of continuously charging the etherate to the top of a packed vacuum tower filled with a material such as Raschig rings, helices, etc., which material is heated in a manner so that the temperature increases from the top to the bottom of the reactor. The hydrocarbons formed during the stabilization are distilled from the top of the tower whereas the desired product gravitates to the bottom thereof.

The dialkylaluminum alkoxide obtained in accordance with the above can be hydrolyzed directly in order to prepare an alcohol corresponding to the alkoxide group. In carrying out the hydrolysis step, it is desirable to first dilute the alkoxide with an appropriate solvent in order to reduce the viscosity thereof. This dilution is not necessary in all instances, but oftentimes facilitates the hydrolysis of the aluminum alcoholates which for the most part, are viscous materials. Among suitable diluents for this purpose there are: n-hexane, heptane or aromatic hydrocarbons, as for example, benzene, toluene, xylene and the like. In general, dilutions with about an equal quantity of the diluent is sufficient to render the aluminum alkoxide of convenient workable viscosity. The solution of the alkoxide can then be treated with an aqueous solution of any of the conventional hydrolyzing agents. Representative of such agents include: hydrochloric acid, sulfuric acid, nitric acid, sodium hydroxide, potassium hydroxide, etc. Additionally, certain organic acids and bases are applicable for this purpose. The hydrolysis can even be accomplished without the use of a hydrolyzing agent if desired, such as in the use of steam at elevated temperatures. Conventional amounts of the hydrolyzing agent are employed and a wide range of hydrolyzing temperatures can be used. Generally, a temperature within the range of from about 20 to 50° C. is observed. Following the hydrolysis reaction, the reaction mixture is then preferably steam stripped of the alcohol and the alcohol-containing distillate is permitted to stand whereupon two phases occur, namely, an aqueous phase and alcohol-diluent layer. The alcohol-diluent layer can then be fractionated by any conventional manner to recover the alcohol component or components.

Rather than directly subject the dialkylaluminum alkoxide obtained in the process of this invention to a hydrolysis procedure, one can alternatively first oxidize same in order to obtain a greater yield of alcohols in the hydrolysis procedure. In so doing, one can obtain upon hydrolysis, as a maximum, three moles of alcohols per mole of the aluminum compound. In this event, one mole of alcohol is attributable to the ether used in the process whereas two moles of alcohol are derived from the alkyl groups associated with the cleavage product.

The oxidation procedure applicable for achieving the foregoing is conventional in the art and generally consists of bubbling oxygen or air through dialkylaluminum alkoxide. It is generally desirable, although not absolutely necessary, that a hydrocarbon diluent or solvent be used to effect solution of a dialkylaluminum alkoxide. In the selection of such suitable solvents or diluents, care should be exercised that one is not used which is subject to oxidation. The solvents mentioned above in connection with the discussion on hydrolysis meet this requirement.

Conditions that can be employed in effecting oxidation of the dialkylaluminum alkoxide vary over a wide range of pressures and temperatures. In general, temperatures that can be used in the oxidation procedure are from about 0 to 90° C. or somewhat higher. Applicable pressures range from 0 to 500 p.s.i. It is, of course, desirable to carry out the oxidation of the dialkylaluminum alkoxide to the extent whereby the alkyl groups are completely oxidized. To determine when oxidation ceases, the effluent gases are measured for oxygen content. Therefore, when the oxygen content of the effluent gas is the same as the gas entering the reaction mixture, it is thus indicated that oxidation is substantially complete. The oxidized products can then be hydrolyzed to yield alcohols according to the hydrolysis procedure outlined hereinabove.

While not forming a part of the instant invention, the dialkylaluminum alkoxides obtained in the process outlined above can be subjected to a growth reaction somewhat similar to that briefly described for the growth of aluminum trialkyls. Normally, dialkylaluminum alkoxides do not give rise to growth products when contacted with a low molecular weight olefin in the usual manner. However, it has been previously discovered that these compounds can be effectively grown in the presence of low molecular olefins such as ethylene and propylene if a catalytic amount of a pure aluminum trialkyl is included in the reaction (growth) mixture. Specific details regarding this type of catalytically induced growth reaction can be found in Annalen der Chemie, Band 629, pages 167–171 (Karl Ziegler and Wolf Rainer Kroll). As pointed out in the aforesaid article, if about 2–5% of an aluminum trialkyl, and preferably one wherein the hydrocarbon substituents are lower alkyls, is added to dialkylaluminum alkoxide based on the weight of the latter, growth can be readily effected. Conditions of temperature and pressure applicable in this specific type of growth reaction substantially correspond to that described for the conventional growth reactions. In operating in the manner described, the alkyl substituents associated with dialkylaluminum alkoxide can be grown to higher molecular weight groups. Consequently, upon oxidation of the growth product and subsequent hydrolysis thereof, one can obtain two moles of a higher molecular weight aliphatic alcohol and one mole of an alcohol corresponding to the ether used in preparing the dialkylaluminium alkoxide.

In order to illustrate further to those skilled in the art how the present invention can be carried out, the following specific example is given in which all parts are parts by weight except as otherwise stated. This example is given primarily by way of illustration and any enumeration of details contained therein should not be interpreted as a limitation on the invention except as indicated in the appended claims.

*Example*

Into a suitable reaction vessel equipped with a thermometer, stirrer and gas collection system, were charged 83 parts of aluminum triethyl and 170 parts of dry, distilled bis(α-methyl-benzyl)-ether. Stirring was commenced at room temperature and maintained for 90 minutes. The temperature rose from 27° C. to 37° C. in this interim. No gas was evolved in this reaction phase. The product obtained after the indicated period of stirring was a clear, colorless mixture comprising a complex or etherate of the charged ether.

The etherate was quickly heated to about 110° C. whereupon a large quantity of gas commenced to evolve. This evolution of gas indicated that the decomposition or cleavage of the etherate was occurring. When the rate of gas generation subsided (approximately 7 hours), the temperature was raised to 130° C. After holding at the latter temperature level for approximately 8 hours, the reaction mixture was heated to 160° C. Holding at this elevated temperature did not result in any gas formation thereby indicating that the reaction was complete. Total time of the decomposition at the various temperatures, beginning at 110° C., was approximately 24 hours.

Analysis of the total amount of gas given off during the reaction indicated same to constitute about 90% ethane and a corresponding minor proportion of olefins, principally ethylene.

The reaction mixture was then stripped under vacuo at elevated temperature (ca. 130–150° C.). The distillate consisted principally of sec. butylbenzene and styrene, and a minor amount of ethyl benzene.

The stripped mixture upon dilution with approximately an equal portion of toluene was hydrolyzed using a dilute solution of HCl. After conventional separation, the organic component was stripped of its fluid content. Thereafter, the stripped material was fractionated, yielding essentially α-methyl-benzyl alcohol and a small amount of bis(α-methyl-benzyl)-ether. Approximately 84 parts of said alcohol were recovered.

What is claimed is:
1. A process for the preparation of a dialkylaluminum aralkoxide which comprises heat-cleaving an etherate obtained by reacting an aluminum trialkyl having alkyl groups containing from 1 to 6 carbon atoms with an ether corresponding to the following general formula:

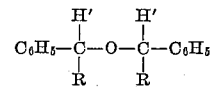

wherein R is a member selected from the group consisting of alkyl, aryl and aralkyl.

2. A process in accordance with claim 1 wherein said aluminum trialkyl is triethylaluminum.

3. A process in accordance with claim 1 wherein said aluminum trialkyl is tripropylaluminum.

4. A process for the preparation of diethylaluminum α-methyl-benzyloxide which comprises: reacting at a temperature between about 20 and 40° C. substantially equimolar amounts of bis(α-methyl-benzyl)ether and aluminum triethyl to form an etherate and heating said etherate at a temperature between about 100 and 160° C. to the extent that substantially all of the aluminum value of the decomposition products derived in heating said etherate exists in a form of diethylaluminum α-methyl-benzyloxide.

References Cited by the Examiner
UNITED STATES PATENTS
2,892,858   6/1959   Ziegler _____ 260—448
FOREIGN PATENTS
804,059   11/1958   Great Britain.

TOBIAS E. LEVOW, *Primary Examiner.*
A. LOUIS MONACELL, *Examiner.*
I. R. PELLMAN, H. M. S. SNEED, *Assistant Examiners.*